United States Patent Office 3,058,944
Patented Oct. 16, 1962

3,058,944
CROSS-LINKING ALPHA-ALKYL POLYMERS WITH POLYSULFONAZIDES AND RESULTING PRODUCT
David S. Breslow and Harold M. Spurlin, Wilmington, Del., assignors to Hercules Powder Company, Wilmington, Del., a corporation of Delaware
No Drawing. Filed Mar. 15, 1961, Ser. No. 95,822
16 Claims. (Cl. 260—41)

This invention relates to cross-linking polymers and to the vulcanizates so produced. More particularly, the invention relates to cross-linking alpha-alkyl polymers with polysulfonazides and to the vulcanizates so produced.

In the past sulfur and sulfur-bearing materials have been used almost exclusively as vulcanizing, i.e., cross-linking, agents. It has more recently been discovered that certain organic peroxides or azo compounds are capable of vulcanizing specific polymers. However, all of the above agents suffer serious drawbacks. Because of their mode of action these agents are not readily effective in cross-linking polymers containing a substantial portion of alpha-alkyl groups. In fact, polymers such as polyisobutylene are actually degraded, i.e., suffer chain scission, when treated with organic peroxides. In addition, many polymers give a blown, i.e., foamed, product when treated with organic azo compounds. Sulfur, on the other hand, has no effect at all on alpha-alkyl polymers.

Now, in accordance with this invention it has unexpectedly been found that alpha-alkyl polymers, i.e., polymers containing at least about 80 mole percent of a component having the formula

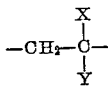

where Y is an alkyl radical and X is a hydrogen or alkyl radical, can be cross-linked by heating in the presence of a polysulfonazide to produce unblown vulcanizates that are tough, resilient, solvent resistant, and odor free. In addition, the resulting vulcanizates possess improved dyeability and soften at a temperature 20° to 25° C. higher than the unvulcanized polymers.

Any polysulfonazide, i.e., any compound having the general formula $$R[SO_2N_3]_x$$

where R is an organic radical inert to the cross-linking reaction and $x$ is an integer greater than 1, can be used in the process of this invention. Preferably, $x$ will be an integer from 2 to 100 and R will b selected from the group of organic radicals consisting of alkylene, arylene, aralkylene, and alkarylene radicals; however, these radicals can be also contain ether, alcohol, etc., groups which are inert to the cross-linking reaction. Exemplary sulfonazides are 1,5-pentane bis(sulfonazide), 1,10-decane bis(sulfonazide), 1,3-benzene bis(sulfonazide), 1-octyl-2,4,6-benzene tris(sulfonazide), 4,4'-diphenylmethane bis(sulfonazide), 4,4'-diphenyl ether bis(sulfonazide), 4,4'-bis-octadecyl biphenyl-3,5,3',5'-tetra (sulfonazide), 4,4'-diphenyl disulfide bis(sulfonazide), 1,6-bis(4'-sulfonazidophenyl) hexane, 2,7-naphthalene bis-(sulfonazide), etc. The sulfonazides will preferably have a solubility in refluxing n-heptane of at least about 0.7%.

Unlike peroxide or azo compounds which upon heating produce a free radical, the polysulfonazides produce a nitrene, i.e., a nitrogen containing a sextet of electrons. Therefore, the type of cross-linking obtained with a polysulfonazide is quite different from that obtained with a free radical generator.

Any polymer, homopolymer, or copolymer containing at least about 80 mole percent of a component having the formula

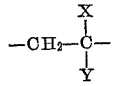

where Y is an alkyl radical and X is a hydrogen or alkyl radical, said alkyl radicals containing from 1 to 18 carbon atoms, can be cross-linked by the process of this invention. The process is applicable whether the polymer be crystalline or amorphous or a mixture thereof. Exemplary of the polymers that can be cross-linked are polypropylene, polyisobutylene, poly(3-methyl-1-butene), butyl rubber, poly(4-methyl-1-pentene), ethylene-propylene copolymers (containing at least about 80 mole percent propylene), etc.

The cross-linking process of this invention can be carried out by heating the polymer in the presence of the polysulfonazide to a temperature at which the sulfonazide decomposes. The temperature varies over a wide range, but, in general, will be in the range of from about 100° C. to about 250° C. Various amounts of the cross-linking agent can be added, the optimum amount depending on the amount of cross-linking desired, the specific sulfonazide employed, etc. In general, the amount added, based on the weight of the polymer, will be from about 0.1% to about 20%.

The cross-linking agent can be incorporated with the polymer in any desired fashion. For example, it can be uniformly blended by simply milling on a conventional rubber mill or dissolved in a solution containing a dispersion of the polymer. By either means the polysulfonazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can also be incorporated. The additives commonly used in rubber vulcanizates can be used here also, as, for example, extenders, fillers, pigments, stabilizers, plasticizers, etc. Exemplary of the fillers that can be added are calcium carbonate, iron oxide, carbon black, silica, calcium silicate (hydrated), alumina, etc. The presence of a filler, and in particular carbon black, is beneficial in some cases. Obviously, there are many cases in which a filler is not required or desired and excellent results are achieved when only the cross-linking agent is added.

The following examples are presented for purposes of illustration, parts and percentages being by weight unless otherwise specified. The molecular weight of the propylene polymers vulcanized is indicated by the reduced specific viscosity (RSV) given for each. By the term "reduced specific viscosity" is meant the $\eta_{sp}/c$ determined on a 0.1% solution (0.1 g. of the polymer per 100 ml. of solution) of the polymer. Melting points, where given, are determined by loss of birefringence.

EXAMPLE 1

A bis(sulfonazide) cross-linking agent was prepared as follows: 1,10-decanedithiol dissolved in a mixture of glacial acetic acid and water was treated with chlorine gas. The resulting 1,10-decane disulfonyl chloride was then reacted with sodium azide to give a good yield of high purity 1,10-decane bis(sulfonazide).

To 320 parts of a 2:1 mixture of benzene-trichloroethylene was added 1.14 parts of the above-prepared 1,10-decane bis(sulfonazide). Into the resulting solution was dispersed 200 parts of a finely divided polypropylene having a crystalline melting point of 168° C. and an RSV of 3.5 as determined in decahydronaphthalene at a temperature of 135° C. The mixture was vacuum dried overnight at 85° C., extruded as coarse monofilaments at a temperature of 210° C. into a water bath, and then chopped into pellets. A film was prepared by pressing a sample of the pelletized polymer under a pressure of 1500 p.s.i. for 8 minutes at 210° C., then for 8 minutes at 230° C., and finally for 8 minutes at 260° C. The resulting clear, unblown film had a softening point which was 16.5° C. higher than untreated polypropylene film, and where untreated polypropylene dissolved in perchloroethylene at 96° C. the film prepared in this manner was insoluble. Samples of the film were tested to determine dyeability using Foron orange GFL and Nacelan scarlet OSB. A comparison of the results obtained using the cross-linked polypropylene with the results obtained using uncross-linked polypropylene showed that dyeability had been enhanced.

EXAMPLE 2

Into a solution of 0.5 parts 1,10-decane bis(sulfonazide) in acetone was dispersed 100 parts of the polypropylene described in Example 1. The acetone was evaporated, the polymer extruded at a temperature of 196° C. into a water bath, and then chopped into pellets. A sample of the pelletized polymer was then subjected to a pressure of 1500 p.s.i. at succeedingly higher temperatures, each temperature level being maintained for 5 minutes. At the end of each heating cycle, the Tinius-Olsen flow was determined at a temperature of 174° C. and a pressure of 200 p.s.i. The Tinius-Olsen flow is an indication of the extent of cross-linking, a decrease in flow indicating an increase in cross-linking. The results of these tests are compared with an untreated polypropylene sample in Table 1.

*Table 1*

TINIUS-OLSEN FLOW [1]

| Temperature | Untreated Polypropylene | Treated Polypropylene |
| --- | --- | --- |
| 177° C | 0.98 | 1.01 |
| 190° C | 1.12 | 0.48 |
| 204° C | 1.35 | 0.19 |
| 232° C | 1.50 | 0.23 |

[1] The inches of flow in 2 minutes.

EXAMPLE 3

A polyisobutylene having a molecular weight of about 100,000 was compounded with carbon black and a polysulfonazide cross-linking agent as follows: To 100 parts of polyisobutylene were added 6 parts of 1,3-benzene bis(sulfonazide), 49 parts of high abrasion furnace black, 5 parts zinc oxide, and one part stearic acid. The 1,3-benzene bis(sulfonazide) had been premixed with a part of the carbon black prior to its addition. The mixture was blended on a 2-roll mill at 79° C. for 10 minutes and then vulcanized between steel plate at 177° C. for 60 minutes under a pressure of 1000 p.s.i. The resulting unblown vulcanizate was a tough, resilient rubber.

EXAMPLE 4

One hundred parts of an isobutylene-isoprene copolymer containing approximately 2.5 mole per cent isoprene and having a molecular weight of about 300,000 was compounded with 6 parts of 1,3-benzene bis(sulfonazide), 49 parts high abrasion furnace black, 5 parts zinc oxide, and 1 part stearic acid, and cross-linked as described in Example 3. The resulting unblown vulcanizate was a tough, resilient rubber.

EXAMPLE 5

Into a solution of 1.0 part of 1,6-hexane bis(sulfonazide) in 200 parts of acetone was dispsersed 100 parts of an ethylene-propylene copolymer containing 3 mole percent ethylene and having a melting point of 163° C. and an RSV of 11 as determined in decahydronaphthalene at a temperature of 135° C. The solvent was removed in vacuo with stirring. The resulting powdery mixture was pressed between steel plates at a temperature of 232° C. and a pressure of 1500 p.s.i. for 20 minutes. The resulting unblown vulcanizate sheet softened at a temperature 20° C. higher than the untreated copolymer and was insoluble in perchloroethylene at 96° C. while the untreated copolymer was soluble.

What we claim and desire to protect by Letters Patent is:

1. A process of cross-linking a polymer containing at least about 80 mole percent of a component having the formula

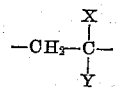

where Y is an alkyl radical, X is a radical selected from the group consisting of hydrogen and alkyl radicals and Y and X combined contain from 1 to 18 carbon atoms which comprises heating said polymer in the presence of a polysulfonazide cross-linking agent having the formula

where R is an organic radical inert to the cross-linking reaction and $x$ is an integer from 2 to 100.

2. The process of claim 1 wherein the polymer is a homopolymer.
3. The process of claim 1 wherein the polymer is a copolymer.
4. The process of claim 1 wherein the polymer contains a filler selected from the group consisting of calcium carbonate, iron oxide, carbon black, and alumina.
5. A polymer containing at least about 80 mole percent of a component having the formula

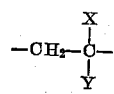

where Y is an alkyl radical, X is a radical selected from the group consisting of hydrogen and alkyl radicals and Y and X combined contain from 1 to 18 carbon atoms cross-linked with a polysulfonazide cross-linking agent having the formula

where R is an organic radical inert to the cross-linking reaction and $x$ is an integer from 2 to 100.

6. The product of claim 5 wherein the polymer is a homopolymer.
7. The product of claim 5 wherein the polymer is a copolymer.
8. The product of claim 5 wherein the polymer contains a filler selected from the group consisting of calcium carbonate, iron oxide, carbon black, and alumina.
9. A process of cross-linking polypropylene which comprises heating said polymer in the presence of 1,10-decane bis(sulfonazide).
10. A process of cross-linking polyisobutylene which comprises heating said polymer in the presence of 1,3-benzene bis(sulfonazide).
11. A process of cross-linking an isobutylene-isoprene copolymer containing at least about 80 mole percent of isobutylene which comprises heating said copolymer in the presence of 1,3-benzene bis(sulfonazide).

12. A process of cross-linking an ethylene-propylene copolymer containing at least about 80 mole percent of propylene which comprises heating said copolymer in the presence of 1,6-hexane bis(sulfonazide).

13. Polypropylene cross-linked with 1,10-decane bis-(sulfonazide).

14. Polyisobutylene cross-linked with 1,3-benzene bis-(sulfonazide).

15. An isobutylene-isoprene copolymer containing at least about 80 mole percent of isobutylene cross-linked with 1,3-benzene bis(sulfonazide).

16. An ethylene-propylene copolymer containing at least about 80 mole percent of propylene cross-linked with 1,6-hexane bis(sulfonazide).

No references cited.